United States Patent [19]

Hertz, Jr.

[11] Patent Number: 4,524,982
[45] Date of Patent: Jun. 25, 1985

[54] SEAL FOR AGGRESSIVE ENVIRONMENTS
[75] Inventor: Daniel L. Hertz, Jr., Red Bank, N.J.
[73] Assignee: Seals Eastern Inc., Red Bank, N.J.
[21] Appl. No.: 566,090
[22] Filed: Dec. 27, 1983
[51] Int. Cl.³ .......................... F16J 9/20; F16J 15/22
[52] U.S. Cl. ..................................... 277/229; 277/230
[58] Field of Search ........................ 277/227, 229, 230
[56] References Cited
U.S. PATENT DOCUMENTS

| | | | |
|---|---|---|---|
| 3,108 | 9/1868 | Bates | 277/229 |
| 3,341,211 | 9/1967 | Houghton et al. | 277/205 |
| 4,214,761 | 7/1980 | Pippert | 277/230 |
| 4,371,180 | 2/1983 | Case et al. | 277/230 |

Primary Examiner—Robert I. Smith
Attorney, Agent, or Firm—Alan H. Levine

[57] ABSTRACT

A seal able to withstand high temperature, high pressure, corrosive environments including a ring-shaped core comprising an elastomer-impregnated asbestos yarn winding, and an elastomer-impregnated asbestos yarn helical winding surrounding and extending along the entire length of the core. The elastomer is a tetrafluorethylene-propylene copolymer or terpolymer, an ethylene-propylene copolymer or terpolymer, or a hydrogenated butadiene-acrylonitrile copolymer. There may be a plurality of helical windings around the core, one overlying another, and each turn of each winding may be parallel to, or at an acute angle to, a diameter of the core which passes through that turn. The cross-sectional shape of the seal may be circular, V-shaped, or any other advantageous seal shape.

11 Claims, 9 Drawing Figures

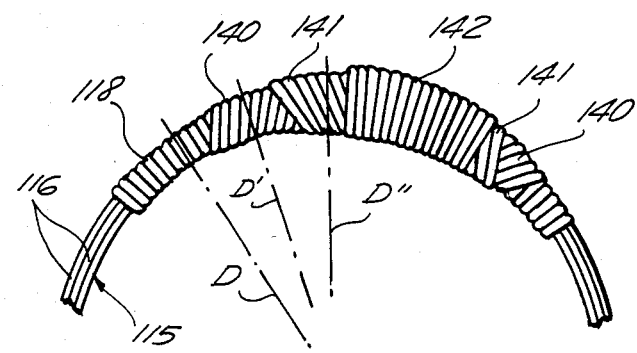
FIG. 9
FIG. 6
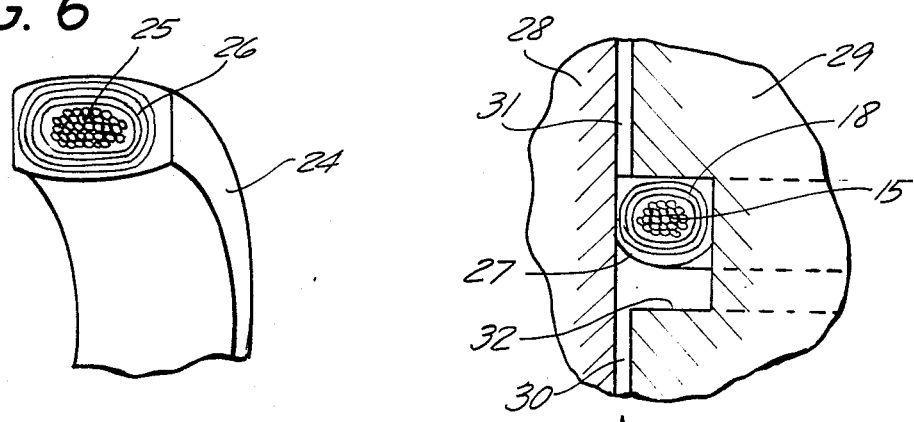
FIG. 7
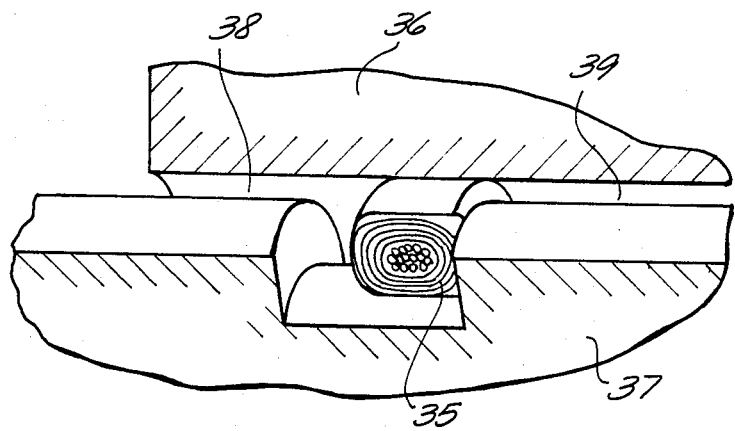
FIG. 8

SEAL FOR AGGRESSIVE ENVIRONMENTS

This invention relates to polymeric seals used to separate two regions containing fluids at different pressures and/or temperatures, and more particularly to such seals capable of withstanding aggressive environments such as those found in geothermal well and oil well installations. The term "aggressive environments" is intended to include within its scope environments created by high temperature fluids, high pressure fluids, and/or corrosive fluids.

Seals fail, i.e., permit fluids to bypass them, for a number of reasons. The polymer of which the seal is made, in whole or in part, can deteriorate as a result of the chemical or thermal action of the fluid being sealed on the seal. The fluid can also cause swelling of the seal material, which weakens it. In addition, the seal can fail mechanically by extruding into the clearance between the two mechanical parts being sealed. For example, an O-ring tends to fail by rolling into the clearance which causes it to deform in a manner similar to peeling veneer off a circular log with a sharp knife edge.

Failure due to chemical or thermal action, and due to swelling, can be minimized by judicious selection of the elastomer used to make the seal. Mechanical failure is usually controlled by increasing the hardness of the seal material so as to increase its shear modulus. However, there is a practical limit to this approach, since if the seal is made too hard, it lacks the resilience needed to perform a sealing function. It is also common to add short fibers of materials such as aramid, asbestos, cellulose, and glass to the elastomer of which the seal is made in an effort to increase its apparent shear modulus. However, this approach does not appear to improve the resistance of seals to extrusion.

It is an object of the present invention to provide a seal which can successfully withstand aggressive environments for long periods of time.

It is another object of the invention to provide a seal which resists chemical and thermal attack, as well as swelling, and which has sufficient mechanical strength to resist extruding into clearances coupled with adequate resiliency for performing its sealing function.

According to the invention, a seal is fabricated by first winding an elastomer-impregnated asbestos yarn into a ring-shaped core. Thereafter, another elastomer-impregnated asbestos yarn is helically wound around the core. The asbestos is very resistant to high temperatures. In addition, it has a high tensile strength, in excess of 800,000 psi, which causes the yarn in the core to resist elongation of the seal, and the yarn in the helical winding to provide great shear strength which resists extrusion of the seal. The elastomers used are extremely resistant to degradation by chemical or thermal attack.

U.S. Pat. No. 3,361,432 shows a seal having a wire mesh core, an asbestos yarn helically wound around the core, and polymerizable sealant over the winding. Such a seal cannot stand up to aggressive environments since the wire mesh core deteriorates. In addition, that core does not resist elongation of the seal since by its nature it is extensible. Furthermore, the particular sealants disclosed will not resist the aggressive environments for which a seal according to this invention is suited.

Additional objects and features of the invention will be apparent from the following description in which reference is made to the accompanying drawings.

In the drawings:

FIG. 6 is a fragmentary perspective view, partially in cross-section, of an alternative shape of seal according to the invention;

FIG. 7 is a fragmentary cross-sectional view of a seal according to the invention assembled with two relatively non-reciprocable parts;

FIG. 8 is a fragmentary perspective view, partially in section, of a seal assembled with two relatively reciprocable parts; and FIG. 9 is a fragmentary face view, with parts broke away, of an alternative embodiment of the seal.

A seal chosen to illustrate the invention, and shown in FIGS. 1–5, is produced by first impregnating chrysotile asbestos yarn with a selected elastomer. The impregnation may be accomplished by bulk dipping of the yarn or by drawing the yarn through a pool of the elastomer while the latter is in a liquid or semi-liquid state. The yarn may have a denier similar to that of ordinary sewing thread, although other deniers can of course be used.

Figure 1:
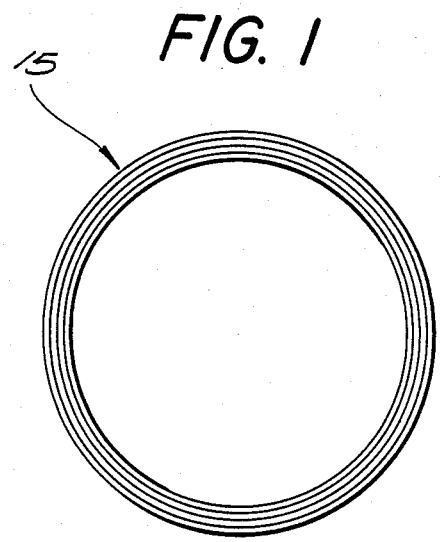
FIG. 1 is a face view of the core of a seal according to the present invention.

A length of the impregnated asbestos yarn is then wound, such as by use of a mandrel, to form a ring-shaped core 15, illustrated in FIG. 1. The yarn of the core 15 is identified in FIGS. 3 and 4 by the reference numeral 16a, and the elastomeric material coating the surface of the yarn is identified by the reference numeral 16b. Another length of the elastomer-impregnated asbestos yarn 18 (FIG. 2) is then helically wound around the core 15 along the entire length of the core. The asbestos yarn of the helical winding is identified in FIGS. 3 and 4 by the reference numeral 18a and the elastomeric material coating the surface of the yarn is identified by the reference numeral 18b. Although in FIGS. 2–4 only a single helical winding 18 is shown, two or more of such helical windings, one on top of the other, may be employed if desired.

Figure 3:
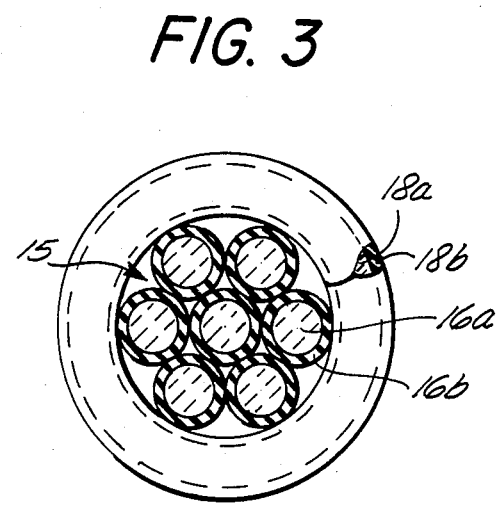
FIG. 3 is a cross-sectional view, on an enlarged scale, taken perpendicular to the circumferential direction of the seal.

After the helical winding is completed, the core 15 carrying the helical winding 18 has the generally circular cross-sectional shape illustrated in FIG. 3. If this is the shape desired in the final seal, the helically wound core is dipped into a pool of the elastomer, and this final coating of elastomer, together with the elastomer impregnating the asbestos yarn, is cured to produce the finished seal. If it is desired to produce a seal having some other cross-sectional shape, e.g., a V-shape, then after the final dipping in elastomer, the seal is placed into a mold 19 (FIG. 4) of appropriate shape. The outer coating 20 of elastomer, together with the elastomer 16b and 18b, are cured under heat and pressure in the mold to produce the finished seal 21 shown in FIG. 5.

A seal 24 having an alternative cross-sectional shape is shown in FIG. 6. In this case, the core 25 has an elongated cross-sectional shape, so that each turn of the helical winding 26 has a similar elongated, generally oval shape. Thus, seals according to the present invention may have any of a wide variety of shapes found in conventional seals.

The preferred elastomer for use in fabricating seals according to the invention is tetrafluorethylene-propylene co or terpolymer, which may be suitably compounded for the particular purpose which the seal will serve. This elastomer resists degradation by oil even at temperatures as high as 250° C. For less demanding oil well applications, i.e., temperatures up to about 175° C., a hydrogenated butadiene-acrylonitrile copolymer, suitably compounded, can be used. For geothermal applications, where oil resistance is not a factor, an ethylene-propylene co or terpolymer, suitably compounded may be employed.

All three of these elastomers are suitable for use in environments in which hydrogen sulfide is present. The tetrafluorethylene-propylene base elastomer is preferred because it can be used in all environments, including those for which the ethylene-propylene and hydrogenated nitrile-butadiene elastomers are useful. The only disadvantage of the preferred elastomer is that it is more expensive than the others. Tetrafluoroethylene-propylene copolymer differs from other fluorelastomers since it does not contain vinylidene fluoride (1,1-difluoroethylene) monomers. These tend to dehydrofluorinate in the presence of heat, steam, and basic environments, yielding hydrogen fluoride (HF). The HF generated not only degrades the asbestos yarn, but also is potentially corrosive to metal.

Asbestos is chosen as the fibrous yarn since it is extremely resistant to high temperature. Moreover, the nature of the asbestos surface, in particular the presence of hydroxyl groups, creates a unique "wetting" interaction between the asbestos and the elastomer. This interaction is extremely resistant to attack by aggressive fluids and high temperature. In contrast, other fibers, such as aramid and glass, do not offer this phenomenon. Adhesion of elastomers to these fibers occurs though creation of fiber/elastomer interphases which do not stand up well to aggressive and high temperature fluids. The asbestos yarn to elastomer ratio should be in the range of about 50/50 to about 95/5, depending upon the desired seal properties for the intended application. Toward the end of the range where the proportion of asbestos far exceeds that of the elastomer, the latter serves the function of a binder or adhesive for holding the various windings together.

FIG. 7 illustrates a seal 27 according to the invention in place between two mechanical parts 28 and 29. These parts may be stationary with respect to each other, or part 29 may rotate about a vertical axis (in FIG. 7) with respect to part 28. However, it is assumed that the parts do not reciprocate, in a vertical direction, with respect to each other. Fluid pressure beneath the seal indicated by arrow F is greater than the fluid pressure above the seal. These fluid pressures are present in the clearances 30 and 31 between the two parts. Part 29 is formed with an annular groove 32 for accommodating seal 27, the groove and seal being so sized that the outer periphery of the seal engages the surface of part 28 opposite the groove.

Figure 5:
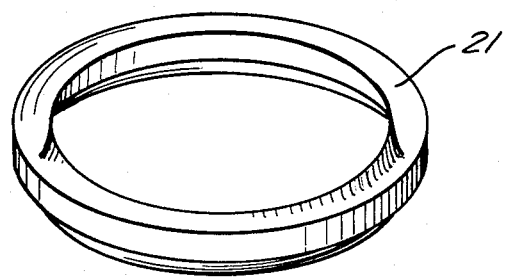
FIG. 5 is a perspective view of a finished seal.

Seal 27 includes, as described above, a core ring-shaped winding 15 of elastomer-impregnated asbestos yarn around which is wrapped one or more helical windings 18 of elastomer-impregnated asbestos yarn. The seal may have had an initially V-shaped cross-section, as shown in FIG. 5; however, the high pressure F acting on the seal has deformed it into a generally rectangular shape. One way in which a conventional seal arranged as shown in FIG. 7 tends to fail is that its outer periphery is extruded into clearance 31 by the fluid pressure F. The seal tends to roll around its circumferential axis as more and more of the seal moves upwardly into clearance 31, leading to ultimate breakdown of the seal. It will be appreciated that the seal 27 of this invention completely resists extrusion into clearance 31 because the turns of the helical winding or windings give the seal extremely high shear strength due to the high tensile strength of the helically wound asbestos yarn.

FIG. 8 shows a seal 35 according to this invention employed as a piston ring between a cylinder block 36 and a piston 37. The piston 37, of course, reciprocates in a horizontal direction in FIG. 8, with respect to block 36. Thus, seal 35 must alternatively resist pressure in clearance 38, when the piston is moving toward the left, and in clearance 39, when the piston is moving toward the right. Here again, the seal of this invention resists extrusion into the clearances 38 and 39 while the parts are operating.

Figure 2:
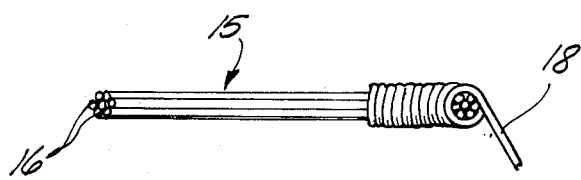
FIG. 2 is a cross-sectional view, taken perpendicular to the plane of the seal, showing a helical winding around the core and extending for part of the length of the core, this being an intermediate stage during manufacture of the seal.
Figure 4:
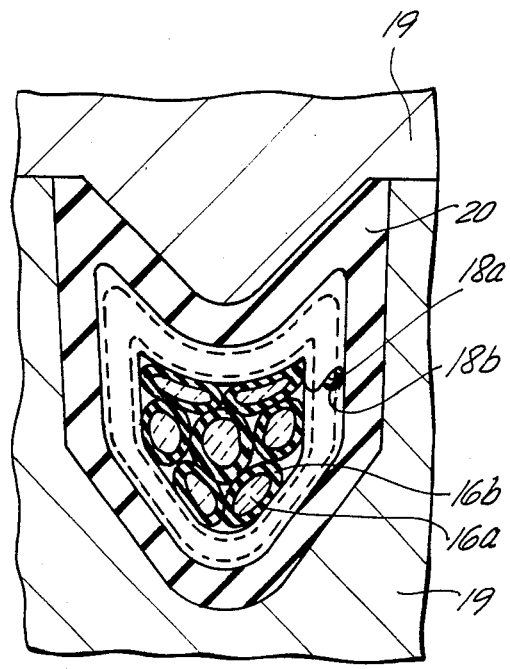
FIG. 4 is a cross-sectional view through a mold being used to shape and cure the seal.

FIGS. 2 and 3 illustrate each turn of the helical winding 18 being in a plane substantially parallel to a diameter of the core 15 which passes through that turn. A seal made in this way will have a high degree of freedom to twist, while resisting elongation, due to the high tensile strength of the asbestos yarn core. If a seal with more torsional rigidity is desired, it may be made as illustrated in FIG. 9. Elastomer-impregnated asbestos yarn 116 is wound to form a ring-shaped core 115. A first helical winding 118 of elastomer-impregnated asbestos yarn is placed around core 115. Each turn of this winding may, like the turns of winding 18, be in a plane substantially parallel to a diameter D of the core 115 which passes through that turn. Overlying winding 118 is a second winding 140, each of the turns of which is a plane arranged at an acute angle to a diameter D' of the core 115 which passes through that turn. Overlying winding 140 is a third winding 141, each of the turns of which is in a plane arranged at an acute angle to a dimeter D'' of the core 115 which passes through that turn. In addition, the plane of each turn of winding 141 is arranged at an acute angle to the plane of each of the turns of winding 140 over which it lies. Another winding 142, oriented in a manner similar to that of winding 118 may overly winding 141. Other variations of the number and orientations of windings may be employed, each of the windings being of elastomer-impregnated asbestos yarn and extending along the entire length of the core 118. Because certain of the windings, e.g., windings 140 and 141, have turns which cross each other, the seal has great torsional rigidity.

In comparative tests, seals according to the present invention have outperformed comparable seals of Kalrez ® (tetrafluorethylene perfluorovinylmethylether copolymer). At 450° F., the Kalrez seal failed dynamically at 5000° psi. At the same temperature, a seal according to this invention continued to operate successfully at 20,000 psi. A seal according to the present invention has also operated successfully at 500° F. and a pressure of 800 psi.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A seal for use in aggressive environments, comprising:
    a ring-shaped core including a winding of asbestos yarn impregnated with an elastomeric material, the winding including a multiplicity of turns of a single length of the yarn, each turn extending in the circumferential direction of the core, and the core being continuous and having no joint transverse to its circumferential length, and
    a helical winding surrounding and extending along the entire length of the core, the helical winding including an asbestos yarn impregnated with an elastomeric material capable of resisting the aggressive environment.

2. A seal as defined in claim 1 including a coating of an elastomeric material, capable of resisting the aggressive environment, completely surrounding the helical winding.

3. A seal as defined in claim 1 wherein the elastomeric material is a tetrafluorethylene-propylene copolymer or terpolymer.

4. A seal as defined in claim 1 wherein the elastomeric material is selected from the group consisting of an ethylene-propylene copolymer or terpolymer, a hydrogenated butadiene-acrylonitrile copolymer, and a tetrafluorethylene-propylene copolymer or terpolymer.

5. A seal as defined in claim 1 including a plurality of elastomer-impregnated asbestos yarn helical windings surrounding the core, the helical windings being arranged one on top of another.

6. A seal as defined in claim 5 wherein each turn of each helical winding is located in a plane substantially parallel to a diameter of the ring-shaped core which passes through that turn.

7. A seal as defined in claim 5 wherein each turn of at least one of the helical windings is located in a plane arranged at an acute angle to a diameter of the ring-shaped core which passes through that turn.

8. A seal as defined in claim 5 wherein each turn of at least two of the helical windings is located in a plane arranged at an acute angle to a diameter of the ring-shaped core, which passes through that turn, the plane of each turn of one of the windings being arranged at an acute angle to the plane of each of the turns of another of the windings over which it lies.

9. A seal as defined in claim 1 wherein the seal has a generally circular cross-sectional shape.

10. A seal as defined in claim 1 wherein the seal has a generally V-shaped cross-sectional shape.

11. A seal as defined in claim 1 wherein the ratio of asbestos yarn to elastomeric material is in the range of about 50/50 to 95/5, by weight.

* * * * *